Patented Dec. 5, 1922.

1,437,802

UNITED STATES PATENT OFFICE.

MAX HARTMANN AND HANS KÄGI, OF BASEL, SWITZERLAND, ASSIGNORS TO SOCIETY OF CHEMICAL INDUSTRY IN BASLE, OF BASEL, SWITZERLAND.

DERIVATIVES OF DIHYDROISOQUINOLINE.

No Drawing.    Application filed November 26, 1921.    Serial No. 517,892.

*To all whom it may concern:*

Be it known that we, MAX HARTMANN and HANS KÄGI, both citizens of the Swiss Republic, and residents of Basel, Switzerland, have invented new Derivatives of Dihydroisoquinoline, of which the following is a full, clear, and exact specification.

We have found, that new derivatives of dihydroisoquinoline can be obtained by treating alpha-acidylaminocinnamic esters of the formula $C_6H_5.CH:C(NH.R_2).CO_2R_1$ (wherein $R_1$ stands for an aryl, alkyl or aralkyl group and $R_2$ for an acidyl group) or their derivatives substituted in the nucleus, as for instance the beta-3.4-dialkyloxyphenylacrylic ester, with hydrogenating agents and transforming the resulting derivative of dihydrocinnamic acid by convenient condensing agents into derivatives of dihydroisoquinoline-3-carboxylic acid.

The alpha-acidylaminocinnamic esters employed as parent materials result, in a known manner, by heating 1 mol. of an aromatic aldehyde, as for instance piperonal or the veratric aldehyde (veratral) with 1 mol. of an acidylated glycocoll, 1 mol. of sodium acetate and 3 mol. of acetic anhydride on a water bath and by esterifying subsequently the resulting azlactones (Ber. 42, 1909, page 1184).

These derivatives of cinnamic acid can be transformed easily and quantitatively by their hydrogenation in solution with hydrogen in presence of catalysts, as for instance nickel or platinum, into the corresponding derivatives of beta-phenyl-alpha-aminopropionic acid.

By heating these compounds with condensing agents ($POCl_3$, $P_2O_5$, $PCl_5$) with or without a solvent the condensation to a dihydroisoquinoline-3-carboxylic ester occurs with a satisfactory yield.

There results for instance from beta-3.4-methylene-dioxyphenyl-alpha-benzoylaminopropionic methylester the 1-phenyl-6.7-methylenedioxydihydroisoquinoline-3-carboxylic methylester.

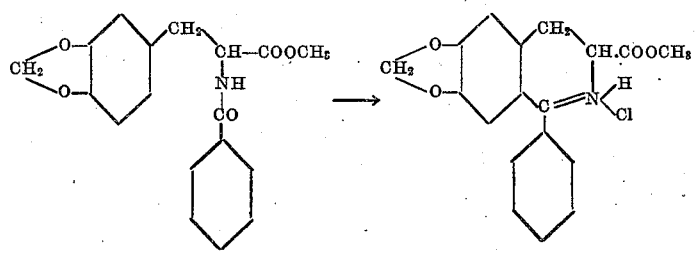

The free esters constitute colorless crystals, insoluble in water; the quaternary ammonium salts formed by the reaction of acids, halogenalkyls or sulfuric alkylesters, show an intense yellow coloration. The new products have therapeutically valuable properties. Thus the 6.7-dioxyderivatives have the same action as hydrastinine, but are less toxic than this latter or its synthetically prepared derivatives. From these they are distinguished furthermore by an easier accessibleness, the hitherto known syntheses of hydrastinine and of its derivatives starting mostly from the not easily obtainable homopiperonylamine.

The invention is more fully illustrated by the following examples.

EXAMPLE I.

*1-phenyl-6.7-dimethoxy-3.4-dihydroisoquinoline-3-carboxylic methylesterchlormethylate.*

1 part of veratralhippuric methylether (B. 42, 1909, page 1185) is suspended in 10 parts of methylalcohol and, after addition of 0.3 parts of a nickel catalyst of 30 per cent, the suspension is shaken with hydrogen under pressure. The absorption of hydrogen occurs only after the inner temperature is raised to 55° C. by an external conveyance of heat. The absorption of hydrogen being terminated, the beta-3.4-dimethoxyphenyl-alpha-benzoylaminopropionic methylester is separated. It constitutes fine, nearly wad-like needles melting at 104–105° C.

1 part of this ester is heated with 1 part of oxychloride of phosphorus on an oil bath at 130–135° C. until the escapement of hydrochloric acid ceases. The reaction product is then decomposed with water to which alcohol has been added and separated by suction from a brown amorphous body and the phenyldimethoxydihydroisoquinoline carboxylic methylester is precipitated from the filtrate by adding soda lye. After recrystallization from methylalcohol, it melts at 122.5° C.

The hydrochlorate and hydrobromate constitute yellow crystals easily soluble in water.

Methyliodide forms with the free ester a N-iodmethylate very difficultly soluble in water, which is transformed with silver chloride into the N-chlormethylate easily soluble, amorphous and very hygroscopic.

Example II.

*1 - phenyl - 6.7 - methylenedioxy-3.4-dihydro-isoquinoline-3-carboxylic methylester-chlormethylate.*

Piperonalhippuric methylester is hydrogenated with hydrogen in an alcoholic solution to which finely divided nickel has been added. After concentrating the solution the alpha-benzoylamino-beta-piperoxylpropionic ester separates in brilliant needles melting at 126–127° C.

Equal parts of this ester and of phosphorus oxychloride are dissolved in a tenfold quantity of toluene and the solution thus obtained is heated to boiling for 2 hours. The product of reaction is decomposed with ice and the separated aqueous solution is made alkaline with soda lye. The precipitated 1-phenyl-6.7-methylene-dioxy-3.4-dihydroisoquinoline-3-carboxylic methylester forms, when recrystallized from alcohol, colorless needles melting at 140.5° C. $PCl_5$ and $P_2O_5$ can also be employed as condensing agent.

The hydrochlorate forms a yellow crystalline mass which can be preserved in the air and is easily soluble in water.

The N-iodmethylate and the N-chlormethylate can be obtained from the free base, as specified in Example I, and possess properties analogous to the halogenmethylates described in the said example.

Example III.

*1.3'.4' - methylenedioxyphenyl - 6.7-methylenedioxy-3.4-dihydroisoquinoline-3-carboxylic-methylester hydrochlorate.*

In a manner analogous to that of Examples I and II there is obtained by heating 1 mol. of piperonal, 1 mol. of piperonyl-glycocoll, 1 mol. of sodium acetate and 3 mol. of acetic anhydride the piperonalpiperonyluric azlactone in form of yellow needles melting at 233° C. By boiling it with the tenfold quantity of methylalcohol and a little quantity of soda, it is transformed into the alpha - piperonoylamino - beta 3.4 - methylene - dioxy - phenylacrylic methylester melting at 155–157° C. The hydrogenation is carried out as in Example II. The alpha - piperonoylamino-beta-3.4-methylene-dioxyphenyl-propionic methylester forms glossy needles melting at 139–140° C.

The 1.3'.4'-methylene - dioxyphenyl - 6.7 - methylene - dioxy-3.4-dihydroisoquinoline-3-carboxylic methylester, obtained by condensing the alpha-piperonoylamino-beta-3.4-methylene-dioxyphenylpropionic methylester with phosphorus oxychloride, melts at 140–141° C. Its hydrochlorate decomposes partly, when dissolved in water, to hydrochloric acid and the insoluble base. N-iodmethylate and N-chlormethylate are formed as in Example I.

Example IV.

*1- beta - phenylethyl-6.7-methylenedioxy-3.4-dihydroisoquinoline-3-carboxylic methylesterchlormethylate.*

By heating 1 mol. of piperonal, 1 mol. of cinnamoylglycocoll, 1 mol. of sodium acetate and 3 mol. of acetic anhydride for several hours on a water bath there is obtained the piperonalcinnamoyluric azlactone melting at 232–233° C. By boiling with methylalcohol and a little quantity of soda, there is obtained the alpha-cinnamoylamino-beta-3.4-methylene-dioxyphenylacrylic methylester melting at 192° C. The hydrogenation of this latter furnishes the α-δ'-phenylpropionylamino-δ-piperonylpropionic methylester melting at 127° C. By condensation with phosphorus oxychloride there is obtained the 1 - beta -phenylethyl-6.7-methylenedioxy-3.4-dihydroisoquinoline-3-carboxylic methylester in short compact prisms melting at 111° C.

The hydrochlorate dissolves in water with strong blue-green fluorescence.

The amorphous N-chlormethylate dissolves very easily in water with a strong yellow coloration but with a less strong fluorescence.

What we claim is:

1. As new products, the herein described dihydroisoquinoline carboxylic esters, constituting in a free state colorless crystals insoluble in water and being transformed by acids and halogenalkyls or sulfuric alkylesters into strongly yellow colored, quaternary ammonium salts.

2. As a new article of manufacture, the herein described 1-phenyl-6.7-methylenedioxy-3.4-dihydroisoquinoline-3-carboxylic methylester, which constitutes colorless needles difficultly soluble in water and melting at 140.5° C. and forms a hydrochlorate and a hydrobromate of yellow coloration easily soluble in water and a yellow iodmethylate difficultly soluble in water.

In witness whereof we have hereunto signed our names this 9th day of November 1921, in the presence of two subscribing witnesses.

MAX HARTMANN.
HANS KÄGI.

Witnesses:
 FRISCHE KURZ,
 AMAND RITTER.